United States Patent [19]

Razvan et al.

[11] Patent Number: 5,298,545
[45] Date of Patent: Mar. 29, 1994

[54] BASIC CALCIUM ALUMINUM HYDROXY PHOSPHITES, A PROCESS FOR THEIR PRODUCTION AND THEIR USE

[75] Inventors: Coriolan Razvan; Reinhard Beck; Albert Puerzer; Alfred Kuerzinger; Michael Rosenthal, all of Munich, Fed. Rep. of Germany

[73] Assignee: Baerlocher GmbH, Munich, Fed. Rep. of Germany

[21] Appl. No.: 867,222

[22] PCT Filed: Dec. 18, 1990

[86] PCT No.: PCT/EP90/02227

§ 371 Date: Jun. 19, 1992

§ 102(e) Date: Jun. 19, 1992

[87] PCT Pub. No.: WO91/08984

PCT Pub. Date: Jun. 27, 1991

[30] Foreign Application Priority Data

Dec. 19, 1989 [DE] Fed. Rep. of Germany ....... 3941902

[51] Int. Cl.$^5$ .................. C01B 25/45; C08K 3/32
[52] U.S. Cl. ...................... 524/414; 423/306
[58] Field of Search .................. 423/306; 524/414

[56] References Cited

U.S. PATENT DOCUMENTS 3,969,293 7/1976 White et al. ............... 524/414
4,799,426 1/1989 Waki et al. ............... 521/93

FOREIGN PATENT DOCUMENTS

| 0139931 | 5/1985 | European Pat. Off. ........ C08K 3/00 |
| 0256872 | 2/1988 | European Pat. Off. . |
| 61095 | 4/1968 | Fed. Rep. of Germany . |
| 2592386 | 7/1987 | France . |
| 47035 | 4/1976 | Japan .................... 524/414 |
| 55-80444 | 6/1980 | Japan . |
| 1-213865 | 8/1989 | Japan . |
| 1146467 | 3/1966 | United Kingdom . |
| 1523531 | 9/1978 | United Kingdom ......... C01G 9/00 |

OTHER PUBLICATIONS

International Search Report.

*Primary Examiner*—Wayne Langel
*Attorney, Agent, or Firm*—Scully, Scott, Murphy & Presser

[57] ABSTRACT

The invention describes basic calcium aluminum hydroxy phosphites of the general formula $$Ca_xAl_2(OH)_{2(x+2)}HPO_3 \cdot mH_2O$$

wherein
x = 2–8 and
m = 0–12 and a process for their production.

The compounds according to the invention are especially suited as stabilizers for halogen-containing polymers, in particular PVC.

7 Claims, No Drawings

BASIC CALCIUM ALUMINUM HYDROXY PHOSPHITES, A PROCESS FOR THEIR PRODUCTION AND THEIR USE

The invention relates to basic calcium aluminum hydroxy phosphites, a process for their production and their use as stabilizers for halogen-containing polymers, in particular polyvinyl chloride.

Halogen-containing, thermoplastic resin compositions or shaped articles made therefrom are decomposed or disintegrated by the action of heat or light. For this reason, stabilizers must be added to these resins. Inorganic and/or organic compounds of toxic heavy metals such as lead, barium or cadmium are customarily used for this for especially demanding articles such as profiles, plates or tubes. 2-basic lead phosphite attained special importance in the stabilizing of e.g. rigid PVC articles where a good thermal resistance and good light and weather resistance are required. The use of basic lead phosphite as stabilizer against the decomposition of PVC by heat, daylight and UV radiation is e.g. described in DD-PS 61 095. CH-PS 8 510 622 describes the stabilizing of rigid and plasticized PVC products with a high filler share with a mixture of basic lead sulphate and lead phosphite. Another use of basic lead phosphite for PVC high-resistance foam mixtures is described in U.S. Pat. No. 4,797,426.

Since basic lead phosphite is rated as toxic like other heavy-metal-containing stabilizers, attempts are made to find stabilizing alternatives. A plurality of combinations of inorganic and organic compounds is known as a stabilizers for halogen-containing, thermoplastic resins. A hydrotalcite is suggested as stabilizer in JP-PS 1 213 865 and in JP-OS 80 445/80. This substance is superior to mixtures of Ca/Zn metallic soaps as regards resistance to heat and transparency However, the problem of the discolouration of the resin during processing due to the use of hydrotalcite cannot be solved. It is suggested according to JP-OS 80 444/82 to use combinations of hydrotalcite and 1,3-diketone compounds. Hydrotalcites have moreover the disadvantage that they split off water and carbon dioxide at the processing temperatures customary for PVC. It is suggested in EP-A- 0 256 872 to eliminate this disadvantage by the addition of very finely divided magnesium oxide. FR-A-2 593 386 describes the use of alkaline earth or alkali phosphites such as calcium phosphites for stabilizing halogen-containing resins.

The invention is based on the object of making available new compounds and a process for their production, which are in particular suited as stabilizers for halogen-containing polymers without having the aforementioned disadvantages of the known stabilizers, and which are in particular rated as non-toxic.

This object is accomplished according to the invention by the making available of calcium aluminum hydroxy phosphites of the general formula

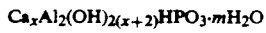

$$Ca_xAl_2(OH)_{2(x+2)}HPO_3 \cdot mH_2O$$

wherein x=2-8 and m=0-12.

In the aforementioned formula x means preferably 3-6 and m means preferably 2-4.

Tests by means of X-ray diffraction showed that the compounds according to the invention do not belong to the hydrotalcite type regarding their crystal structure.

Surprisingly, it became apparent that the calcium aluminum hydroxy phosphites according to the invention impart resistance to heat comparable to that of basic lead phosphites to halogen-containing, thermoplastic resin and the shaped articles produced therefrom. The compounds according to the invention prevent discolouring in the production of e.g. rigid PVC shaped articles, colour retention and weather stability of the shaped articles stabilized with the compounds according to the invention is equivalent to that of the products stabilized with toxic heavy metal compounds.

The subject matter of the invention is also a process for the production of the calcium aluminum hydroxy phosphites according to the invention, which is characterized in that mixtures of calcium hydroxide and/or calcium oxide, aluminum hydroxide and sodium hydroxide or of calcium hydroxide and/or calcium oxide and sodium aluminate are reacted with phosphorous acid in amounts corresponding to the production of the desired compounds in an aqueous medium and the reaction product is separated and recovered in a manner known per se.

The reaction product directly obtained by the reaction described above can be separated from the aqueous reaction medium according to known processes, preferably by means of filtration. The processing of the separated reaction product is also carried out in a manner known per se, e.g. by means of the washing of the filter cake with water and drying of the washed residue at temperatures of e.g. 60° to 130° C., preferably at 90° to 120° C.

Both a finely divided, active aluminum hydroxide in combination with sodium hydroxide and a sodium aluminate can be used for the reaction. Calcium can be used in the form of finely divided calcium oxide or calcium hydroxide or mixtures thereof. The phosphorous acid can be used in differently concentrated form.

The reaction temperatures are preferably between about 50° and 100° C., and more preferably between about 60° and 85° C. Catalysts or accelerators are not necessary. The water of crystallization can be removed wholly or partly by means of thermal treatment in the compounds according to the invention.

If they are used as stabilizers, the dried calcium aluminum hydroxy phosphite according to the invention do not split off any water at the processing temperatures of 160° to 200° C. being e.g. customary for rigid PVC so that no disturbing bubble formation occurs in the shaped articles.

To improve their dispersibility in halogen-containing thermoplastic resins, the compounds according to the invention can be coated with surface-active agents in a known fashion.

According to the invention, halogen-containing, thermoplastic resins can be stabilized with the calcium aluminum hydroxy phosphites according to the invention. Polyvinyl chlorides, homopolymers and copolymers thereof and their mixtures with other polymers, which are produced in known fashion are especially suited for this, such as e.g. ABS (acrylonitrile/butadiene/styrene), CPVC (post-chlorinated PVC), acrylates and the like.

Further additives can of course be incorporated into the resin in addition to the compounds according to the invention. Examples for such additives are organotin compounds, organic phosphites, epoxy compounds, amino compounds, polyhydric alcohols, metallic soaps of $C_8$–$C_{22}$ fatty acids with metals such as Ca, Zn, Mg or Al, antioxidants, ultraviolet absorbers, carbonyl compounds, antistatic agents, lubricants, plasticizers, waxes, pigments and fillers.

The following examples explain the invention.

A) Production of the Basic Calcium Aluminum Hydroxy Phosphites

Example 1

An aqueous suspension (5.2 l) of 222 g of calcium hydroxide (3 mole), 80 g of sodium hydroxide (2 mole) and 156 g of active aluminum hydroxide (2 mole ) is heated to 60° C. 234.3 g of phosporous acid (2 mole) in the form of a 70% aqueous solution are subsequently added at uniform feed rate under stirring in the course of 30 minutes, the temperature being maintained. Thereupon the suspension is heated to 85° C. and kept at this temperature under stirring for 3 hours. 10 minutes prior to the end of the reaction time, 5 g of sodium stearate are added for coating. The suspension obtained in this fashion is filtered out, washed with 1.5 l of water and the filter cake is dried in a drying cabinet at 115° C. for 3 hours.

The analysis values of the product produced in this fashion are indicated below.

| Molar ratio | Found value | Calculated value |
|---|---|---|
| Ca | 3.1 | 3 |
| Al | 1.9 | 2 |
| P | 1.2 | 1 |

Example 2

An aqueous suspension (6.4 l) of 296 g of calcium hydroxide (4 mole) and 164 g of sodium aluminate (2 mole) is heated to 50° C. 234 3 g of phosporous acid (2 mole) in the form of a 70% aqeuous solution are subsequently added at uniform feed rate under stirring in the course of 30 minutes, the temperature being maintained. Thereupon the suspension is heated to 85° C. and kept at this temperature under stirring for 3 hours. 10 minutes prior to the end of the reaction time, 6 g of sodium stearate are added for coating The suspension obtained in this fashion is filtered out, washed with 1.5 l of water and the filter cake is dried in a drying cabinet at 115° C. for 3 hours.

The analysis values of the product produced in this fashion are indicated below.

| Molar ratio | Found value | Calculated value |
|---|---|---|
| Ca | 4.05 | 4.0 |
| Al | 1.85 | 2.0 |
| P | 1.15 | 1.0 |

Example 3

An aqueous suspension (7.2 l) of 444 g of calcium hydroxide (6 mole) and 164 g of sodium aluminate (2 mole) is heated to 50° C. 234.3 g of phosporous acid (2 mole) in the form of a 70% aqeuous solution are subsequently added at uniform feed rate under stirring in the course of 30 minutes, the temperature being maintained.

Thereupon the suspension is heated to 85° C. and kept at this temperature under stirring for 4 hours. 10 minutes prior to the end of the reaction time, 8 g of sodium stearate are added for coating. The suspension obtained in this fashion is filtered out, washed with 1 8 l of water and the filter cake is dried in drying cabinet at 115° C. for 3 hours.

The analysis values of the product produced in this fashion are indicated below.

| Molar ratio | Found value | Calculated value |
|---|---|---|
| Ca | 6.1 | 6 |
| Al | 1.8 | 2 |
| P | 1.2 | 1 |

B) Use of the Compounds According to the Invention as Stabilizers

The resistance to heat, the ultraviolet resistance and the initial color of PVC shaped bodies to which the compounds according to the invention have been added are rated in the following examples.

The PVC resin composition is homogenized and plastified at 180° C. for 5 minutes on a laboratory rolling mill. Square sample sheets with an edge length 15 mm are cut from the band being about 1 mm thick and produced in this fashion. These sample sheets are tempered in the drying oven at 180° C. At an interval of 10 minutes one sheet each is withdrawn and applied onto a test card. This process is repeated that often until the sample sheets have a black discolouring.

Square pieces are cut to an edge length for the evaluation of the ultraviolet resistance. Several of these pieces are stapled on a polished and chromium-plated steel plate, enclosed by a metal frame with a thickness of 2 mm and covered with a steel plate which is also polished and chromium plated. Sample bodies of exactly defined thickness and with a smooth surface are thus produced in a heated press These samples are exposed in a Xenotest device in accordance with DIN 53385.

The time which elapses until the sample has clearly changed its initial colour is determined. The longer this period of time is, the higher is the ultraviolet resistance.

The initial colour was directly rated on the aforementioned pressed shaped bodies.

Example 4

| | Parts by weight | | | | | | | |
|---|---|---|---|---|---|---|---|---|
| | A | B | C | D | E | F | G | H |
| PVC (K 68) | 100 | 100 | 100 | 100 | 100 | 100 | 100 | 100 |
| Impact strength additive* | 10 | 10 | 10 | 10 | 10 | 10 | 10 | 10 |
| Chalk | 5 | 5 | 5 | 5 | 5 | 5 | 5 | 5 |
| TiO$_2$ | 4 | 4 | 4 | 4 | 4 | 4 | 4 | 4 |
| Distearyl phthalate | 0.5 | 0.5 | 0.5 | 0.5 | 0.5 | 0.5 | 0.5 | 0.5 |
| Bisphenol A | 0.2 | 0.2 | 0.2 | 0.2 | 0.2 | 0.2 | 0.2 | 0.2 |
| Phenyl didecyl phosphite | 0.3 | 0.3 | 0.3 | 0.3 | 0.3 | 0.3 | 0.3 | 0.3 |

-continued

|  | Parts by weight | | | | | | | |
|---|---|---|---|---|---|---|---|---|
|  | A | B | C | D | E | F | G | H |
| Lead stearate | 0.8 | 0.8 | — | — | — | — | — | — |
| $2PbOPbHPO_3 \cdot 0.5H_2O$ | 2.0 | 3 | — | — | — | — | — | — |
| Zinc stearate | — | — | 0.6 | 0.6 | 0.6 | 0.6 | 0.6 | 0.6 |
| Calcium laurate | — | — | 0.8 | 0.8 | 0.8 | 0.8 | 0.8 | 0.8 |
| $Ca_3Al_2(OH)_{10}HPO_3 \cdot 2H_2O$ | — | — | 2.5 | 4.0 | — | — | — | — |
| $Ca_4Al_2(OH)_{12}HPO_3 \cdot 3H_2O$ | — | — | — | — | 2.5 | 4.0 | — | — |
| $Ca_6Al_2(OH)_{16}HPO_3 \cdot 3H_2O$ | — | — | — | — | — | — | 2.5 | 4.0 |

*Bärodur EST-3

The aforementioned compositions of A to H were produced and tested in accordance with the indicated methods. The results are summarized in Tables I and II.

TABLE I

Results of the evaluation of thermal stability

| Compo- | Time (min.) | | | | | | | | | | |
|---|---|---|---|---|---|---|---|---|---|---|---|
| sition | 0 | 10 | 20 | 30 | 40 | 60 | 80 | 100 | 120 | 150 | 200 |
| A | 1 | 1 | 1 | 1 | 4 | 6 | 7 | 7 | 8 | — | — |
| B | 1 | 1 | 1 | 1 | 1 | 1 | 4 | 4 | 7 | 7 | 8 |
| C | 1 | 1 | 1 | 1 | 2 | 3 | 5 | 7 | 8 | — | — |
| D | 1 | 1 | 1 | 1 | 1 | 2 | 3 | 3 | 7 | 7 | 8 |
| E | 1 | 1 | 1 | 2 | 3 | 3 | 7 | 7 | 8 | — | — |
| F | 1 | 1 | 1 | 2 | 2 | 3 | 3 | 3 | 7 | 7 | 8 |
| G | 1 | 1 | 1 | 2 | 3 | 3 | 3 | 3 | 8 | — | — |
| H | 1 | 1 | 2 | 3 | 3 | 3 | 3 | 3 | 3 | 7 | 8 |

1 = White; 2 = slightly yellow; 3 = yellow; 4 = slightly grey; 5 = orange; 6 = grey; 7 = brown; 8 = black

TABLE II

Results of the evaluation of resistance to light

| Composition | Time (hours) | | | | | |
|---|---|---|---|---|---|---|
|  | 0 | 500 | 1000 | 1500 | 2000 | 4000 |
| A | 1 | 1 | 1 | 1 | 3 | 5 |
| B | 1 | 1 | 1 | 1 | 1 | 4 |
| C | 1 | 1 | 1 | 1 | 2 | 4 |
| D | 1 | 1 | 1 | 1 | 1 | 4 |
| E | 1 | 1 | 1 | 1 | 2 | 3 |
| F | 1 | 1 | 1 | 1 | 1 | 3 |
| G | 1 | 1 | 1 | 2 | 3 | 6 |
| H | 1 | 1 | 1 | 1 | 1 | 6 |

1 = white; 2 = slightly yellow; 3 = slightly grey; 4 = yellow; 5 = grey; 6 = brown

Example 5

|  | Parts by weight | | | | |
|---|---|---|---|---|---|
|  | I | J | K | L | M |
| PVC (K 68) | 100 | 100 | 100 | 100 | 100 |
| Impact strength additive* | 10 | 10 | 10 | 10 | 10 |
| Chalk | 5 | 5 | 5 | 5 | 5 |
| $TiO_2$ | 4 | 4 | 4 | 4 | 4 |
| Distearyl phthalate | 0.5 | 0.5 | 0.5 | 0.5 | 0.5 |
| Bisphenol | 0.2 | 0.2 | 0.2 | 0.2 | 0.2 |
| Phenyl didecyl phosphite | 0.3 | 0.3 | 0.3 | 0.3 | 0.3 |
| Zinc stearate | 0.6 | 0.6 | 0.6 | 0.6 | 0.6 |
| Calcium laurate | 0.8 | 0.8 | 0.8 | 0.8 | 0.8 |
| $Ca_4Al_2(OH)_{12}HPO_3 \cdot 3H_2O$ | 2.5 | 2.5 | 2.5 | 2.5 | 2.5 |
| Pentaerythritol | — | 0.5 | — | — | — |
| Epoxidized soy oil | — | — | 2.0 | — | — |
| Ethyl amino crotonate | — | — | — | 0.3 | — |

-continued

|  | Parts by weight | | | | |
|---|---|---|---|---|---|
|  | I | J | K | L | M |
| Dibenzoyl methane | — | — | — | — | 0.1 |

*Bärodur EST-3

The aforementioned compositions of I to M were produced and tested in accordance with the indicated methods. The results are summarized in Tables III and IV.

TABLE III

Results of the evaluation of thermal Stability

| Compo- | Time (min.) | | | | | | | | | | |
|---|---|---|---|---|---|---|---|---|---|---|---|
| sition | 0 | 10 | 20 | 30 | 40 | 60 | 80 | 100 | 120 | 150 | 200 |
| I | 1 | 1 | 1 | 2 | 3 | 3 | 5 | 5 | 6 | — | — |
| J | 1 | 1 | 2 | 3 | 3 | 3 | 4 | 4 | 5 | 6 | — |
| K | 1 | 1 | 1 | 1 | 2 | 3 | 3 | 3 | 3 | 3 | 5 |
| L | 1 | 1 | 1 | 1 | 1 | 6 | — | — | — | — | — |
| M | 1 | 1 | 1 | 1 | 1 | 1 | 3 | 4 | 5 | 5 | 6 |

1 = white; 2 = slightly yellow; 3 = yellow; 4 = orange; 5 = brown; 6 = black

TABLE IV

Results of the evaluation of the initial colour

| Composition | Visual estimate Judgement |
|---|---|
| I | good |
| J | sufficient |
| K | good |
| L | very good |
| M | very good |

Example 6

|  | N | O | P | R |
|---|---|---|---|---|
| PVC K 70 | 100 | 100 | 100 | 100 |
| Dioctyl phthalate | 40 | 40 | 40 | 40 |
| Chalk | 30 | 30 | 30 | 30 |
| Lead stearate | 0.6 | — | — | — |
| 2-basic lead phosphite | 2.0 | — | — | — |
| Zinc stearate | — | 0.3 | 0.3 | 0.3 |
| Calcium stearate | — | 0.6 | 0.6 | 0.6 |
| $Ca_3Al_2(OH)_{10}HPO_3 \cdot 2H_2O$ | — | 2.5 | — | — |
| $Ca_4Al_2(OH)_{12}HPO_3 \cdot 3H_2O$ | — | — | 2.5 | — |
| $Ca_6Al_2(OH)_{16}HPO_3 \cdot 3H_2O$ | — | — | — | 2.5 |

The aforementioned compositions of N to R were produced and tested in accordance with the indicated methods and the thermal stability was rated. The results are summarized in Table V.

TABLE V

| Composition | Time (min.) | | | | | | | | | | |
|---|---|---|---|---|---|---|---|---|---|---|---|
| | 0 | 10 | 20 | 40 | 60 | 80 | 120 | 160 | 180 | 200 | 220 |
| N | 1 | 1 | 1 | 2 | 2 | 2 | 2 | 3 | 3 | 4 | — |
| O | 1 | 1 | 1 | 1 | 1 | 2 | 3 | 3 | 4 | — | — |
| P | 1 | 1 | 1 | 1 | 2 | 2 | 2 | 3 | 3 | 4 | — |
| R | 1 | 1 | 1 | 2 | 2 | 2 | 3 | 3 | 3 | 3 | 4 |

1 = white; 2 = yellow; 3 = brown; 4 = black

We claim:

1. Basic calcium aluminum hydroxy phosphites of the general formula $$Ca_xAl_2(OH)_{2(x+2)}HPO_3 \cdot mH_2O$$

wherein
x = 3-8 and
m = 0-12.

2. Phosphites according to claim 1, wherein x is 3-6.
3. Phosphites according to claim 2, wherein m is 2-4.
4. A process for the production of basic calcium aluminum hydroxy phosphite compounds comprising reacting a mixture of calcium hydroxide and/or calcium oxide, aluminum hydroxide and sodium hydroxide or of calcium hydroxide and/or calcium oxide and sodium aluminate with phosphorous acid in amounts corresponding to those required to produce basic calcium aluminum phosphite compounds having the general formula:

$$Ca_xAl_2(OH)_{2(x+2)}HPO_3 \cdot mH_2O$$

wherein x = 3-8; and m = 0-12; in an aqueous medium and separating and recovering said basic calcium aluminum phosphite compounds.

5. A process according to claim 4, characterized in that the reaction is carried out at a temperature between about 50° and 100° C.

6. A process for stabilizing halogen-containing polymers which comprises:
admixing a stabilizing effective amount of a phosphite of any one of claims 1-3 within a halogen containing polymer.

7. A process according to claim 6 wherein the halogen-containing polymer is polyvinyl chloride.

* * * * *

UNITED STATES PATENT AND TRADEMARK OFFICE
CERTIFICATE OF CORRECTION

PATENT NO.  : 5,298,545
DATED       : March 29, 1994
INVENTOR(S) : Bert M. Zuckerman, et al.

It is certified that error appears in the above-indentified patent and that said Letters Patent is hereby corrected as shown below:

Column 3, line 35: "234 3" should read --234.3--
Column 3, line 42: after "coating" insert --.--
Column 4, line 13: "1 8" should read --1.8--
Column 4, line 48: after "press" insert --.--
Column 4, line 49: "53385" should read --53388--

Signed and Sealed this

Twenty-eight Day of February, 1995

Attest:

BRUCE LEHMAN

Attesting Officer

*Commissioner of Patents and Trademarks*